United States Patent
Zhou et al.

(10) Patent No.: US 12,094,028 B2
(45) Date of Patent: Sep. 17, 2024

(54) HIGH DYNAMIC RANGE (HDR) VIDEO ROTATION ANIMATION

(71) Applicant: QUALCOMM Incorporated, San Diego, CA (US)

(72) Inventors: Zhibing Zhou, Shenzhen (CN); Mohammed Naseer Ahmed, Pickering (CA); Xinchao Yang, Shanghai (CN); Nan Zhang, Beijing (CN); Yongjun Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 116 days.

(21) Appl. No.: 17/909,989

(22) PCT Filed: Apr. 8, 2020

(86) PCT No.: PCT/CN2020/083726
§ 371 (c)(1),
(2) Date: Sep. 7, 2022

(87) PCT Pub. No.: WO2021/203286
PCT Pub. Date: Oct. 14, 2021

(65) Prior Publication Data
US 2023/0105401 A1    Apr. 6, 2023

(51) Int. Cl.
G06T 1/20 (2006.01)
G06T 1/60 (2006.01)
G06T 13/00 (2011.01)

(52) U.S. Cl.
CPC .......... *G06T 1/20* (2013.01); *G06T 1/60* (2013.01); *G06T 13/00* (2013.01)

(58) Field of Classification Search
None
See application file for complete search history.

(56) References Cited

U.S. PATENT DOCUMENTS

2010/0265259 A1* 10/2010 Faye-Lund ............... G06T 3/40
                                                             345/506
2014/0078172 A1*  3/2014 Systrom ................. G06F 3/041
                                                             345/629
(Continued)

FOREIGN PATENT DOCUMENTS

CN    102547301 A      7/2012
CN    103493487 A      1/2014
WO    2017019818 A1    2/2017

OTHER PUBLICATIONS

International Search Report and Written Opinion—PCT/CN2020/083726—ISA/EPO—Dec. 30, 2020.
(Continued)

*Primary Examiner* — Andrew G Yang
(74) *Attorney, Agent, or Firm* — QUALCOMM Incorporated

(57) ABSTRACT

In some aspects, the present disclosure provides a method for high dynamic range (HDR) video rotation. The method includes receiving, by a display processor, an indication that a frame rotation animation process for video playback has been initiated, the display processor comprising a display processor pipeline. The method also includes determining whether the video playback is an HDR format or another format. In response to the determination and receiving the indication: bypassing a loading of the frame rotation animation into a first portion of the display processor pipeline, and loading the frame rotation animation into a second portion of the display processor pipeline if the video playback is in an HDR format.

22 Claims, 4 Drawing Sheets

(56) References Cited

U.S. PATENT DOCUMENTS

| | | | |
|---|---|---|---|
| 2014/0362117 A1* | 12/2014 | Paulson | G06F 3/017 345/659 |
| 2018/0165814 A1* | 6/2018 | Gulati | G06T 7/001 |
| 2019/0073176 A1* | 3/2019 | Holland | G06F 3/14 |

OTHER PUBLICATIONS

Minoo (ARRIS) K., et al., "Description of the Exploratory Test Model (ETM) for HDR/WCG Extension of HEVC", JCTVC-W0092, Joint Collaborative Team on Video Coding (JCT-VC) of ITU-T SG 16 WP 3 and ISO/IEC JTC 1/SC29/WG 11, 23rd Meeting, San Diego, USA, Feb. 19-26, 2016, pp. 1-4, the whole document.

* cited by examiner

HIGH DYNAMIC RANGE (HDR) VIDEO ROTATION ANIMATION

CROSS-REFERENCE TO RELATED APPLICATIONS

This application is a national stage application under 35 U.S.C. 371 of PCT/CN2020/083726 filed Apr. 8, 2020, which is hereby expressly incorporated by reference herein in its entirety as if fully set forth below and for all applicable purposes.

BACKGROUND

Field of the Disclosure

The teachings of the present disclosure relate generally to graphics and display operations, and more particularly, to techniques for improving rotation animation performance.

Description of the Related Art

Video playback can be displayed by an electronic device using any suitable display and/or user interface. In some cases, dimensions of the video playback can change as a user moves the electronic device. For example, a device may be rotated such that a display of the video playback switches between a portrait mode and a landscape mode. In some cases, the device can provide a graphical transition between the portrait and landscape modes, for example using a graphics engine to render a rotation animation.

However, such animations can require significant processing power, which can be of limited supply in portable electronic devices. Moreover, such animations may suffer from flicker issues caused by different display parameters being used between graphic and display processors. Thus, implementing a rotation animation in an electronic device may pose challenges.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Certain aspects relate to a method for high dynamic range (HDR) video rotation. The method includes receiving, by a display processor, an indication that a frame rotation animation process for video playback has been initiated, the display processor comprising a display processor pipeline. The method also includes determining whether the video playback is an HDR format or another format. The method also includes in response to the determination and receiving the indication: if the video playback is in an HDR format: bypassing a loading of the frame rotation animation into a first portion of the display processor pipeline, and loading the frame rotation animation into a second portion of the display processor pipeline. The method also includes, if the video playback is in the other format, loading the frame rotation animation into the first portion of the display processor pipeline, wherein the second portion is further in processing steps of the display processor pipeline than the first portion.

Certain aspects relate to an apparatus, comprising a memory and a processor coupled to the memory. In some examples, the processor and the memory are configured to receive an indication that a frame rotation animation process for video playback has been initiated, the processor comprising a display processor pipeline; determine whether the video playback is an HDR format or another format; in response to the determination and the received indication: if the video playback is in an HDR format: bypass a loading of the frame rotation animation into a first portion of the display processor pipeline, and load the frame rotation animation into a second portion of the display processor pipeline; and if the video playback is in the other format, load the frame rotation animation into the first portion of the display processor pipeline, wherein the second portion is further in processing steps of the display processor pipeline than the first portion.

Certain aspects relate to an apparatus, comprising: means for receiving an indication that a frame rotation animation process for video playback has been initiated, the means for receiving comprising a processor pipeline; means for determining whether the video playback is an HDR format or another format; in response to a determination of a format of the video playback, and receipt of the indication: if the video playback is in an HDR format: means for bypassing a loading of the frame rotation animation into a first portion of the display processor pipeline, and means for loading the frame rotation animation into a second portion of the display processor pipeline; and if the video playback is in the other format, means for loading the frame rotation animation into the first portion of the display processor pipeline, wherein the second portion is further in processing steps of the display processor pipeline than the first portion.

Certain aspects relate to a non-transitory computer-readable storage medium that stores instructions that when executed by a processor of an apparatus cause the apparatus to perform a method for high dynamic range (HDR) video rotation, the method comprising: receiving, by a display processor, an indication that a frame rotation animation process for video playback has been initiated, the display processor comprising a display processor pipeline; determining whether the video playback is an HDR format or another format; in response to the determination and receiving the indication: if the video playback is in an HDR format: bypassing a loading of the frame rotation animation into a first portion of the display processor pipeline, and loading the frame rotation animation into a second portion of the display processor pipeline; and if the video playback is in the other format, loading the frame rotation animation into the first portion of the display processor pipeline, wherein the second portion is further in processing steps of the display processor pipeline than the first portion.

Aspects of the present disclosure provide apparatus, processors, computer-readable mediums, and means for performing techniques and methods for high dynamic range (HDR) video rotation animation.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
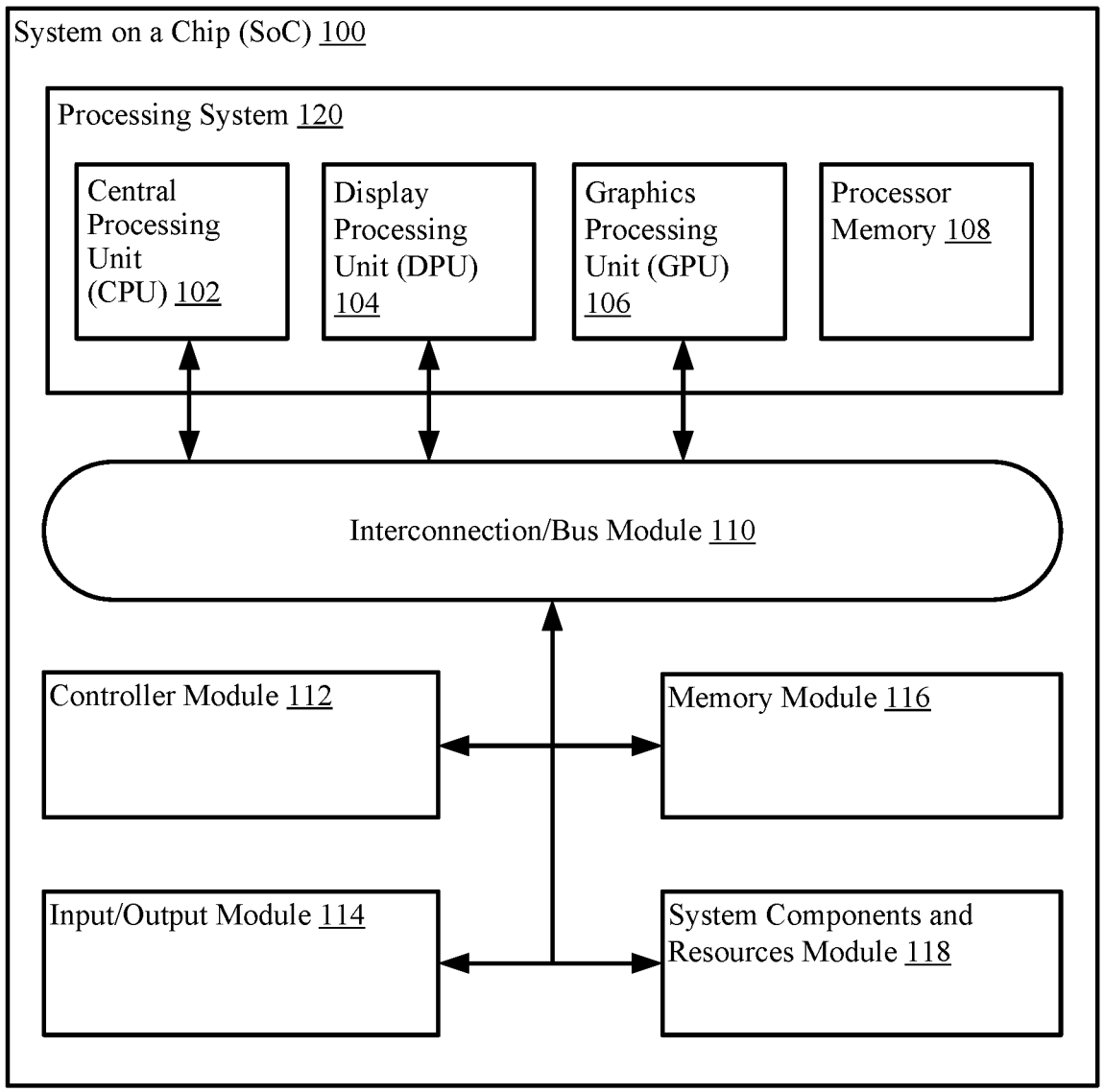
FIG. 1 is a block diagram illustrating an exemplary system-on-chip (SoC) integrated circuit in accordance with certain aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with various other embodiments discussed herein.

The term "system on chip" (SoC) is used herein to refer to a single integrated circuit (IC) chip that contains multiple resources and/or processors integrated on a single substrate. A single SoC may contain circuitry for digital, analog, mixed-signal, and radio-frequency functions. A single SoC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.), any or all of which may be included in one or more cores.

A number of different types of memories and memory technologies are available or contemplated in the future, all of which are suitable for use with the various aspects of the present disclosure. Such memory technologies/types include phase change memory (PRAM), dynamic random-access memory (DRAM), static random-access memory (SRAM), non-volatile random-access memory (NVRAM), flash memory (e.g., embedded multimedia card (eMMC) flash, flash erasable programmable read only memory (FEPROM)), pseudostatic random-access memory (PSRAM), double data rate synchronous dynamic random-access memory (DDR SDRAM), and other random-access memory (RAM) and read-only memory (ROM) technologies known in the art. A DDR SDRAM memory may be a DDR type 1 SDRAM memory, DDR type 2 SDRAM memory, DDR type 3 SDRAM memory, or a DDR type 4 SDRAM memory.

Each of the above-mentioned memory technologies include, for example, elements suitable for storing instructions, programs, control signals, and/or data for use in or by a computer or other digital electronic device. Any references to terminology and/or technical details related to an individual type of memory, interface, standard or memory technology are for illustrative purposes only, and not intended to limit the scope of the claims to a particular memory system or technology unless specifically recited in the claim language. Mobile computing device architectures have grown in complexity, and now commonly include multiple processor cores, SoCs, co-processors, functional modules including dedicated processors (e.g., communication modem chips, global positioning system (GPS) processors, display processors, etc.), complex memory systems, intricate electrical interconnections (e.g., buses and/or fabrics), and numerous other resources that execute complex and power intensive software applications (e.g., video streaming applications, etc.).

FIG. 1 is a block diagram illustrating an exemplary system-on-chip (SoC) 100 suitable for implementing various aspects of the present disclosure. The SoC 100 includes a processing system 120 that includes a plurality of heterogeneous processors such as a central processing unit (CPU) 102, a display processing unit 104, a graphics processing unit 106, and a processor memory 108. It should be noted that the processing system 120 may include additional processing units, for example digital signal processors (DSPs), application processors, etc. As used herein, a processing unit may include one or more processors and any suitable support hardware and/or software (e.g., registers, combinational logic, controllers, etc.). The processing system 120 may include one or more cores, and each processor/core may perform operations independent of the other processors/cores. The processing units 102, 104, and 106 may be organized in close proximity to one another (e.g., on a single substrate, die, integrated chip, etc.) so that they may operate at a much higher frequency/clock-rate than would be possible if the signals were to travel off-chip. The proximity of the cores may also allow for the sharing of on-chip memory and resources (e.g., voltage rail), as well as for more coordinated cooperation between cores.

The processing system 120 is interconnected with one or more controller module(s) 112, input/output (I/O) module(s) 114, memory module(s) 116, and system component and resources module(s) 118 via a bus module 110 which may include an array of reconfigurable logic gates and/or implement bus architecture (e.g., CoreConnect, advanced microcontroller bus architecture (AMBA), etc.). Bus module 110 communications may be provided by advanced interconnects, such as high performance networks on chip (NoCs). The interconnection/bus module 110 may include or provide a bus mastering system configured to grant SoC components (e.g., processors, peripherals, etc.) exclusive control of the bus (e.g., to transfer data in burst mode, block transfer mode, etc.) for a set duration, number of operations, number of bytes, etc. In some cases, the bus module 110 may implement an arbitration scheme to prevent multiple master components from attempting to drive the bus simultaneously.

The controller module 112 may be a specialized hardware module configured to manage the flow of data to and from the memory module 116, the processor memory 108, or a memory device located off-chip (e.g., a flash memory device). In some examples, the memory module may include a UFS host device configured to receive various memory commands from multiple masters, and address and communicate the memory commands to a memory device. The multiple masters may include processing units 102, 104, and 106, and/or multiple applications running on one or more of the processing units 102, 104, and 106. The controller module 112 may comprise one or more processors configured to perform operations disclosed herein. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

The I/O module 114 is configured for communicating with resources external to the SoC. For example, the I/O module 114 includes an input/output interface (e.g., a bus architecture or interconnect) or a hardware design for performing specific functions (e.g., a memory, a wireless device, and a digital signal processor). In some examples, the I/O module includes circuitry to interface with peripheral devices, such as a memory or digital storage device located off-chip.

The memory module 116 is a computer-readable storage medium implemented in the SoC 100. The memory module 116 may provide non-volatile storage, such as flash memory, for one or more of the processing system 120, controller module 112, I/O module 114, and/or the system components and resources module 118. The memory module 116 may include a cache memory to provide temporary storage of information to enhance processing speed of the SoC 100.

The SoC 100 may include a system components and resources module 118 for managing sensor data, analog-to-digital conversions, wireless data transmissions, and for performing other specialized operations (e.g., supporting interoperability between different devices). System components and resources module 118 may also include components such as voltage regulators, oscillators, phase-locked loops, peripheral bridges, data controllers, system controllers, access ports, timers, and other similar components used to support the processors and software clients running on the computing device. The system components and resources 118 may also include circuitry for interfacing with peripheral devices, such as cameras, electronic displays, wireless communication devices, external memory chips, etc.

Figure 2:
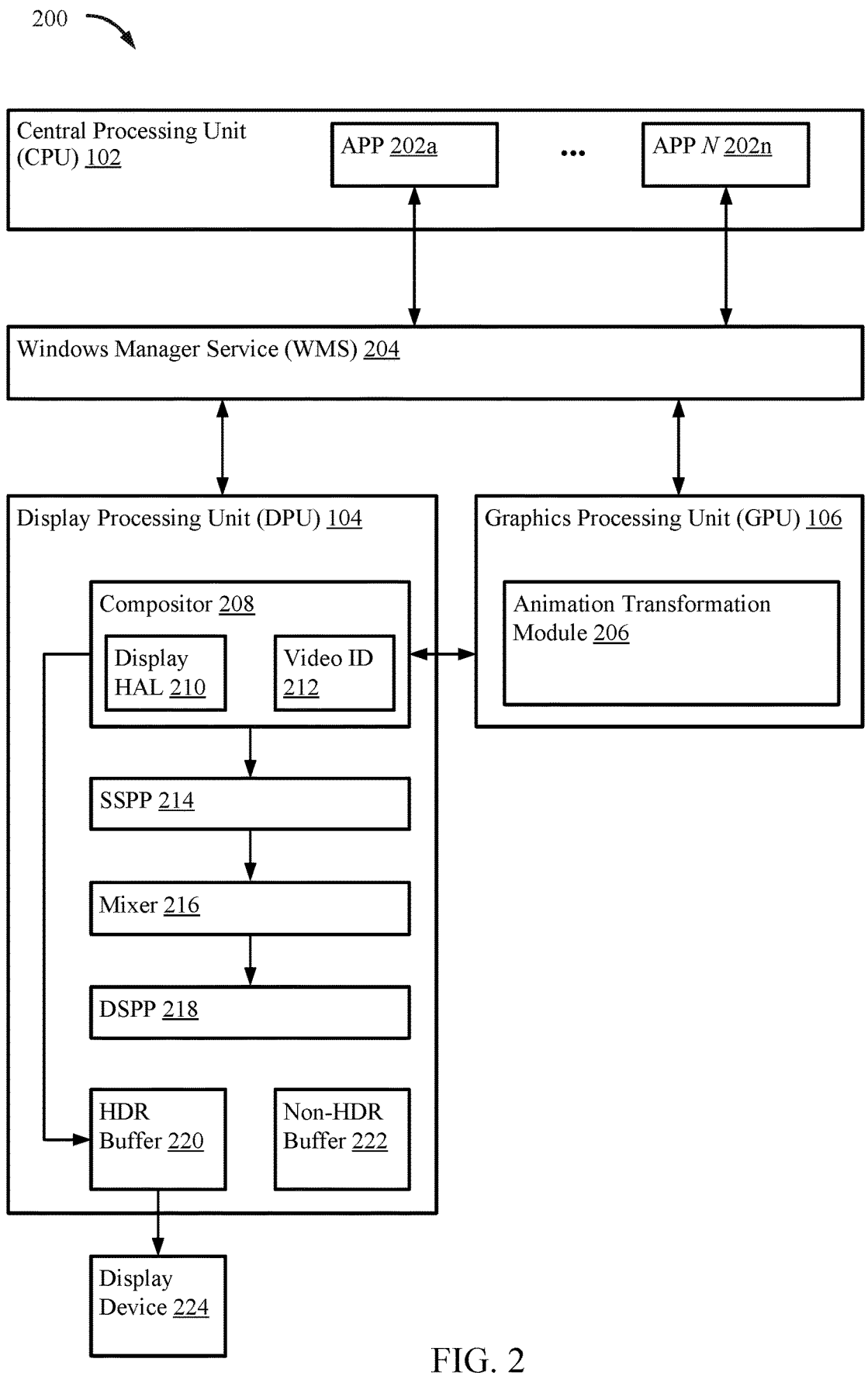
FIG. 2 is block diagram illustrating an exemplary computing device in accordance with certain aspects of the present disclosure.

FIG. 2 is block diagram illustrating an exemplary computing device 200 in accordance with certain aspects of the present disclosure. In some embodiments, the computing device 200 may be implemented on the SoC 100 of FIG. 1, or any other suitable computing system. As discussed further herein, the computing device 200 provides an improved user experience and reduced power consumption by eliminating display flicker of a rotation animation and by bypassing one or more display processing elements.

The computing device 200 includes the CPU 102, DPU 104, and GPU 106 of FIG. 1. In certain aspects, one or more applications 202a-202n (collectively referred to as "applications 202") may be executed on the CPU 102, and may communicate with a windows manager service (WMS) 204. The WMS 204 is in communication with the DPU 104 and the GPU 106. In this example, the GPU 106 includes an animation transformation module 206. The DPU 104 includes a display processor pipeline having multiple components configured for preparing data for display. In this example, the display processor pipeline includes a compositor 208, a source surface processor pipe (SSPP) 214, a mixer 216, a display surface processor pipe (DSPP) 218, and one or more buffers (e.g., HDR buffer 220 and non-HDR buffer 222). The compositor 208 comprises a display hardware abstraction layer (HAL) 210 and a video identification (ID) module 212. The compositor 208 may communicate with the SSPP 214, and the SSPP 214 may communicate with a mixer 216. The mixer 216 may communicate with the DSPP 218, which may output processed display data to the HDR buffer 220 and non-HDR buffer 222, from which a display device 224 may pull the processed display data for display.

The components illustrated in FIG. 2 may be realized by hardware, software in connection with hardware, firmware, or a combination thereof. And although not required, one or more of the components (e.g., the display HAL 210 and video ID module 212) may be realized by additions and modifications readily apparent to one of ordinary skill in the art (in light of this disclosure) to existing computing devices. For example, the embodiment depicted in FIG. 2 may be realized by modifying user-level and kernel level components of an ANDROID-based computing device.

The WMS 204 generally functions to manage a z-ordered list of visible windows, and manage how the windows are laid out on a display device 224. Among other things, it automatically performs window transitions and animations when opening or closing an app or rotating the screen. A z-order is an ordering of overlapping two-dimensional objects, such as a background and an image or video frame. For example, if a display is in a portrait mode, the z-ordering may include a black background and an overlapping frame for video playback.

Generally, the GPU 106 may perform various functions on image and video data for presentation on the display device 224. For example, the GPU 106 may perform functions such as shading, blending, illuminating, and others to generate pixel values for data to be displayed. In this example, the GPU 106 includes an animation transformation module 206 configured to generate a screen rotation animation using one or more image and/or video frames. For example, if a user rotates the computing device 200 during video playback, the WMS 204 may request that the GPU 106 use the animation transformation module 206 to generate a screen rotation animation using one or more image and/or video frames that will be presented to the user via the display device 224 during transition between landscape and portrait modes.

Generally, the DPU 104 is configured to receive and retrieve image and/or video frames from an application 202a running on the CPU 102, a memory or digital storage (e.g., the processor memory 108 or memory module 116 of FIG. 1), or the WMS 204. The DPU 104 may perform one or more image processing operations on the frames, and output the processed frames to the display device 224 for display. Such image processing operations may include format converting, scaling, rotation, blending, and compositing, layering of the image with additional graphics, and the like. In other words, the DPU 104 obtains video and/or image data and outputs values that cause the pixels of the display device 224 to illuminate and display the video or image.

The compositor 208 generally manages video and/or image data from one or more applications 202. Although not required, the compositor 208 may be realized by a SurfaceFlinger module (or a derivative of the SurfaceFlinger module) of the ANDROID framework. In some examples, the CPU 102 may execute multiple applications 202 with independent video and/or image data to be displayed on the display device 224. Compositor 208 determines what will be shown on the display device 224, and provides overlay compositions as needed. In some aspects, the compositor 208 is configured to receive/retrieve video and/or image data from one or more buffers used by the applications 202, and compose the data for later display.

The compositor 208 includes a display hardware abstraction layer (HAL) 210 used by the compositor 208 to perform composition using hardware resources of the DPU 104, the GPU 106, processor memory 108, and/or any other suitable hardware. The compositor 208 also includes a video ID module 212 configured to determine a display format of video and/or image data. For example, the video ID module 212 may determine whether the video and/or image data received from the one or more buffers is a high dynamic range (HDR) format, a standard dynamic range (SDR) format, or some other format.

The SSPP 214 may receive video and/or image data from compositor 208, or may retrieve video and/or image data from a buffer used by the applications 202. The SSPP 214 may perform format conversion and quality improvement for videos and images. For example, SSPP 214 may process image data by performing color space conversion, content adaptive contrast enhancement, and the like on the received image data, and may output the processed image to a mixer 216.

The mixer 216 may receive image data processed by the SSPP 214 and may perform blending and mixing of the image with one or more other surfaces. For example, mixer 216 may perform alpha blending, color generation, setting of a transparency color key, blending of surfaces in arbitrary order, and blending in linear space. Mixer 216 may then output the blended/mixed image data to DSPP 218.

The DSPP 218 may perform conversion, correction, and adjustments on the image received from mixer 216 based on particular characteristics of display device 224. For example, DSPP 218 may perform operations for sunlight visibility improvement, content adaptive backlight scaling, panel color correction, gamma correction, dithering, picture adjustments, and the like. Once DSPP 218 has completed its operations on the image data, the DSPP 218 may output the processed image data to one of the HDR buffer 220 or the non-HDR buffer 222, such that the processed image data is queued for display on the display device 224.

Example Techniques for Improved HDR Video Rotation Animation

The orientation of a display or user interface can be changed in many different types of applications when the user rotates an electronic device or equipment. For example, the orientation of the display can change in applications providing textual information, graphical information, or combinations of these. For illustration purposes, the following discussion will describe changing the orientation of a display in the context of an application providing HDR video playback. It will be understood, however, that the disclosure can apply to any other suitable application provided by the electronic device.

Figure 3:
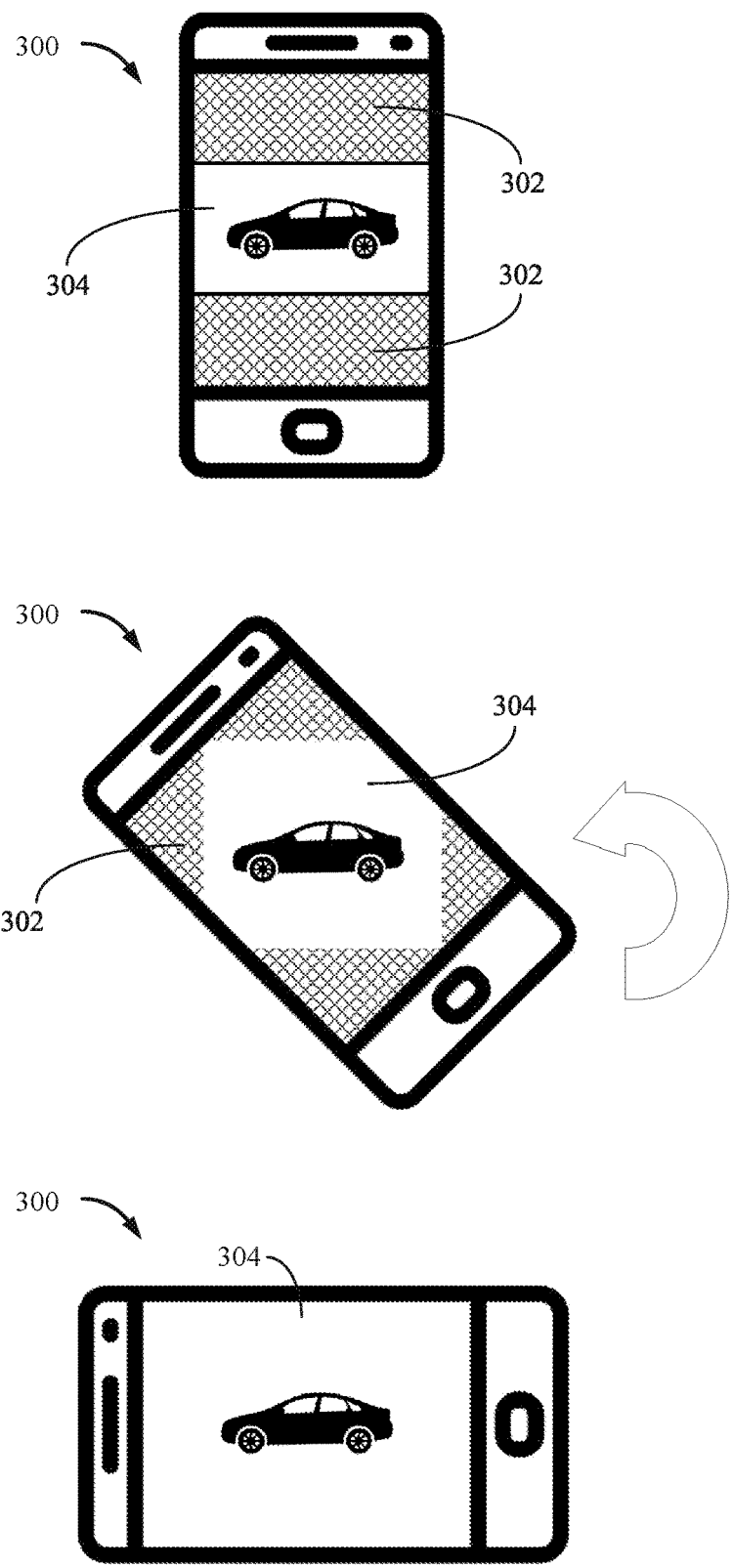
FIG. 3 is a schematic view of an electronic device being rotated from a portrait orientation to a landscape orientation in accordance with certain aspects of the present disclosure.

FIG. 3 is a schematic view of an electronic device 300 being rotated from a portrait orientation to a landscape orientation, and the display transitioning from a portrait mode display to a landscape mode display in response to the electronic device being rotated. In this example, the electronic device 300 displays an HDR video playback initially positioned in a portrait mode. The portrait mode display includes a background layer 302 and a video playback layer 304.

As the electronic device 300 is rotated, a rotation animation presented on the display, showing a rotation of the video playback layer 304 and the background layer 302 into a landscape mode display. In the example shown, the background layer 302 is gradually eliminated during the transition from portrait mode to landscape mode, and video playback layer 304 is gradually resized to fit the entire display. Similarly, in response to a rotation of the electronic device 300 from a landscape orientation to a portrait orientation, the background layer 302 may be gradually introduced to the display during the transition from landscape mode to portrait mode, and video playback layer 304 gradually resized to fit a reduced area of the display. As such, the rotation animation is configured to present to the user an animation of the resizing of the video playback layer 304 to accommodate the orientation of the electronic device, as well as a gradual introduction or elimination of a background layer 302.

As noted previously, the GPU 106 may be configured to generate the rotation animation based on one or more frames of the video playback. However, when the rotation animation is processed through the display processor pipeline, one or more components may reduce the quality of the rotation animation. For example, the GPU 106 and the DPU 104 may operate using different tone, color, contrast, etc. mapping parameters. Use of these components may also unnecessarily use power for image processing that is not required.

For example, in a conventional system, and in response to determining that the electronic device is being rotated, the WMS may request that the GPU generate a screen rotation animation, and request a screen capture buffer from DPU. That is, the GPU will use a frame from the video playback to generate the screen rotation animation, and will send the generated screen rotation animation to the screen capture buffer requested by the WMS. However, in a conventional system, the DPU will not determine whether the video playback is in an HDR format prior to receiving and displaying the rotation animation. Accordingly, in response to the request for the screen capture buffer, the DPU will provide a non-HDR buffer. Consequently, the DPU processing pipeline will process the rotation animation as if it is non-HDR (e.g., SDR). Because the DPU and the GPU may have differences in their tone and color mapping parameters, additional processing by the DPU may reduce the quality of the rotation animation.

Referring now to FIG. 2, techniques for improved HDR video rotation animation will be described. Initially, and in response to determining that the electronic device is being rotated, the WMS 204 may start a screen rotation process by requesting that the GPU 106 utilize the animation transformation module 206 to generate a screen rotation animation, and requesting a screen capture buffer (e.g., HDR buffer 220 and non-HDR buffer 222) from the compositor 208 of the DPU 104. That is, the DPU 104 receives an indication that a frame rotation animation process for video playback has been initiated.

In response to the request for a screen capture buffer, the compositor 208 may utilize the video ID module 212 to determine whether the video playback is an HDR format or another format. If the video ID module 212 determines that the video playback is a non-HDR format, then the compositor 208 may return an address or identification of the non-HDR buffer 222 to the WMS 204. The WMS 204 may then retrieve the rotation animation from the GPU 106 and pass the rotation animation for processing by the remaining components of the processor pipeline: the SSPP 214, the mixer 216, and the DSPP 218. The DSPP 218 may then store the processed rotation animation in the non-HDR buffer 222 for later display on the display device 224.

If the video ID module 212 determines that the video playback is an HDR format, then in response to both the determination and the WMS indication, the display HAL 210 may initiate a concurrent write-back (CWB) function configured to allow the compositor 208 to both: (i) return an address or identification of the HDR buffer 220 to the WMS 204 as the screen capture buffer, and (ii) bypass a loading of the rotation animation into one or more components of the display processor pipeline. For example, the CWB function may provide the compositor 208 and/or the WMS 204 the ability to write the rotation animation data and/or background frame data directly into the HDR buffer 220 without passing the rotation animation data through one or more of the SSPP 214, mixer 216, or DSPP 218. In some examples, the HDR buffer 220 is configured to store HDR format display data, while the non-HDR buffer 222 may be configured to store non-HDR format display data, such as SDR format data. In some examples, the HDR buffer 220 may include an RGBA1010102 buffer and range from 10 to 24 bits. In contrast, the non-HDR buffer 222 may range from 8 to 16 bits.

In some examples, the compositor 208 is configured to close (e.g., power down, put to sleep, bypass, etc.) the DSPP 218 in response to the determination that the video playback is HDR format. Thus, by closing the DSPP 218, the compositor 208 and/or the WMS 204 is able to bypass the loading of the rotation animation into the DSPP 218 prior to loading the rotation animation into the HDR buffer 220. The compositor 208 may then receive an indication from the WMS 204 that the frame rotation animation process has ended. In response, the compositor 208 may open the DSPP 218 and end the bypass.

In this example, the frame used by the GPU 106 to generate the rotation animation is an HDR format frame. Thus, the rotation animation data is in an HDR format. Accordingly, by closing one or more components of the DPU 104, less power is consumed for image/video processing. Moreover, because the rotation animation is already in an HDR format, by bypassing components of the display processing pipeline, the rotation animation does not experience degradation due to a mismatch of mapping data between the DPU 104 and the GPU 106.

Figure 4:
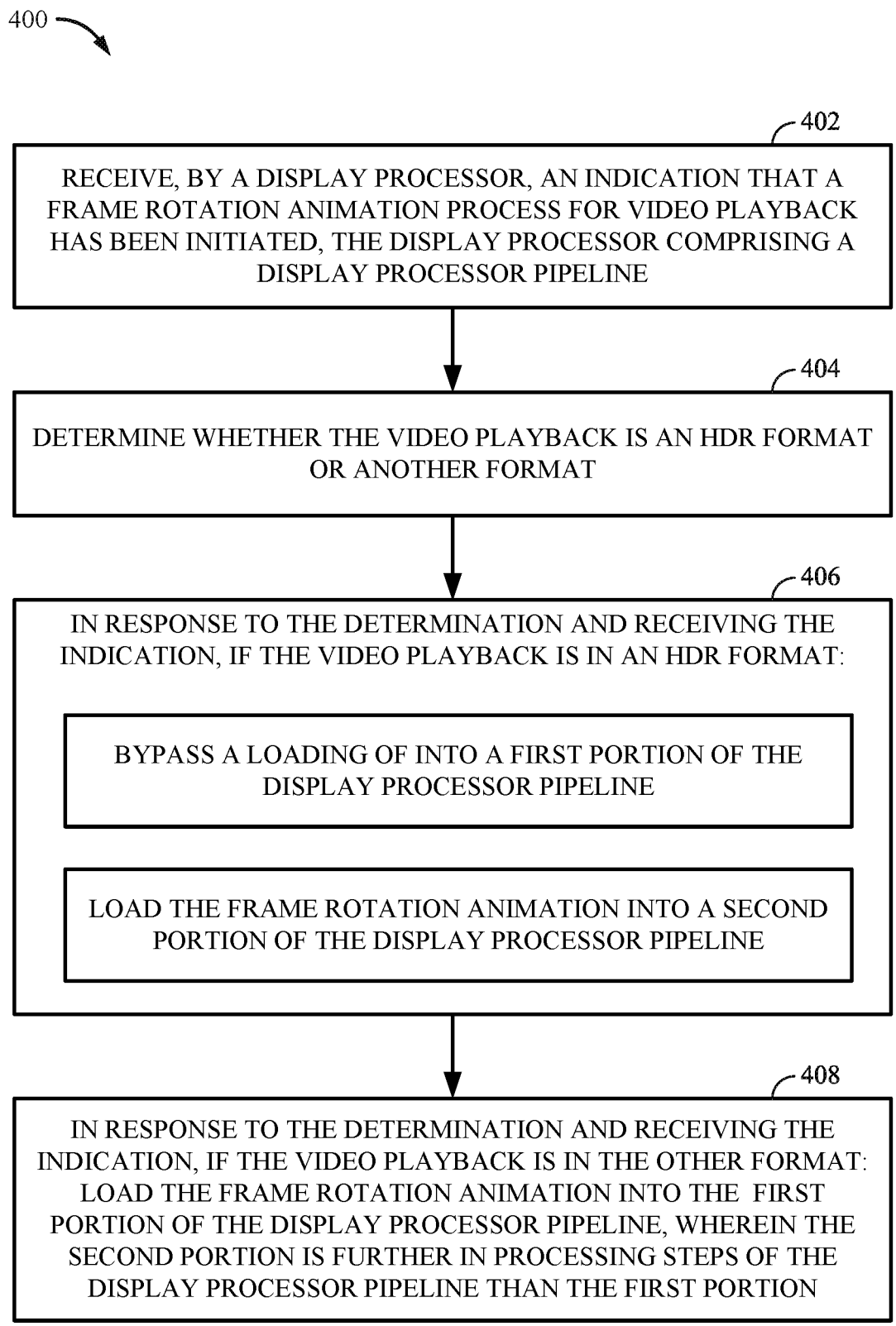
FIG. 4 is a flow chart illustrating example operations for improving HDR video rotation animation in accordance with certain aspects of the present disclosure.

FIG. 4 is a flow chart illustrating example operations 400 for improving HDR video rotation animation. The operations 400 may be performed, for example, by an SoC (e.g., SoC 100 of FIG. 1) and/or an electronic device (e.g., computing device 200 of FIG. 2). Operations 400 may be implemented as software components that are executed and run on one or more processors (e.g., processing system 120 of FIG. 1). In certain aspects, the transmission and/or reception of data by various hardware components may be implemented via a bus interface (e.g., bus module 110 of FIG. 1).

In this example, the operations 400 start at a first step 402 receiving, by a display processor, an indication that a frame rotation animation process for video playback has been initiated, the display processor comprising a display processor pipeline. The operations 400 then proceed to step 404, by determining whether the video playback is an HDR format or another format.

The operations 400 then proceed to step 406, where in response to the determination and receiving the indication, if the video playback is in an HDR format: bypassing a loading of the frame rotation animation into a first portion of the display processor pipeline, and loading the frame rotation animation into a second portion of the display processor pipeline.

If the video playback is in the other format, then operations 400 then proceed to step 408, by loading the frame rotation animation into the first portion of the display processor pipeline, wherein the second portion is further in processing steps of the display processor pipeline than the first portion.

In certain aspects, loading the frame rotation animation into the first portion comprises loading the frame rotation animation into a first buffer, and loading the frame rotation animation into the second portion comprises loading the frame rotation animation into a second buffer.

In certain aspects, the second buffer is configured for storing HDR format data, and the first buffer is configured for storing non-HDR format data.

In certain aspects, operations 400 further comprise executing a concurrent write-back function to enable loading the frame rotation animation into the second portion if the video playback is in an HDR format.

In certain aspects, the display processor pipeline comprises a source surface processor pipe (SSPP), a display surface processor pipe (DSPP), and a mixer.

In certain aspects, bypassing the loading of the frame rotation animation into the first portion of the display processor pipeline further comprises closing, by the display processor, the DSPP in response to determining that the video playback is HDR format.

In certain aspects, operations 400 further comprise receiving, by the display processor, an indication that the frame rotation animation process has ended; and opening, by the display processor, the DSPP in response to the indication that the frame rotation animation process has ended.

In certain aspects, determining whether the video playback is an HDR format or another format is performed by the display processor.

ADDITIONAL CONSIDERATIONS

In some configurations, the term(s) 'communicate,' 'communicating,' and/or 'communication' may refer to 'receive,' 'receiving,' 'reception,' and/or other related or suitable aspects without necessarily deviating from the scope of the present disclosure. In some configurations, the term(s) 'communicate,' 'communicating,' 'communication,' may refer to 'transmit,' 'transmitting,' 'transmission,' and/or other related or suitable aspects without necessarily deviating from the scope of the present disclosure.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits.

One or more of the components, steps, features and/or functions illustrated herein may be rearranged and/or combined into a single component, step, feature or function or embodied in several components, steps, or functions. Additional elements, components, steps, and/or functions may also be added without departing from novel features disclosed herein. The apparatus, devices, and/or components illustrated herein may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for" or simply as a "block" illustrated in a figure.

These apparatus and methods described in the detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software, firmware, middleware, microcode, hardware description language, or otherwise. The software may be stored on non-transitory computer-readable medium included in the processing system.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

What is claimed is:

1. A method for high dynamic range (HDR) video rotation, comprising:
receiving, by a display processor, an indication that a frame rotation animation process for video playback has been initiated, the display processor comprising a display processor pipeline;
determining whether the video playback is an HDR format or another format;
in response to the determination and receiving the indication:
if the video playback is in an HDR format:
bypassing a loading of the frame rotation animation into a first portion of the display processor pipeline, and
loading the frame rotation animation into a second portion of the display processor pipeline; and
if the video playback is in the other format, loading the frame rotation animation into the first portion of the display processor pipeline, wherein the second portion is further in processing steps of the display processor pipeline than the first portion,
wherein the display processor pipeline comprises a source surface processor pipe (SSPP), a display surface processor pipe (DSPP), and a mixer, and wherein bypassing the loading of the frame rotation animation into the first portion of the display processor pipeline further comprises closing, by the display processor, the DSPP in response to determining that the video playback is HDR format.

2. The method of claim 1, wherein loading the frame rotation animation into the first portion comprises loading the frame rotation animation into a first buffer, and loading the frame rotation animation into the second portion comprises loading the frame rotation animation into a second buffer.

3. The method of claim 2, wherein the second buffer is configured for storing HDR format data, and the first buffer is configured for storing non-HDR format data.

4. The method of claim 1, further comprising executing a concurrent write-back function to enable loading the frame rotation animation into the second portion if the video playback is in an HDR format.

5. The method of claim 1, further comprising:
receiving, by the display processor, an indication that the frame rotation animation process has ended; and
opening, by the display processor, the DSPP in response to the indication that the frame rotation animation process has ended.

6. The method of claim 1, wherein determining whether the video playback is an HDR format or another format is performed by the display processor.

7. An apparatus, comprising:
a memory; and
a processor coupled to the memory, the processor and the memory configured to:
receive an indication that a frame rotation animation process for video playback has been initiated, the processor comprising a display processor pipeline;
determine whether the video playback is an HDR format or another format;
in response to the determination and the received indication:
if the video playback is in an HDR format:
bypass a loading of the frame rotation animation into a first portion of the display processor pipeline, and
load the frame rotation animation into a second portion of the display processor pipeline; and
if the video playback is in the other format, load the frame rotation animation into the first portion of the display processor pipeline, wherein the second portion is further in processing steps of the display processor pipeline than the first portion,
wherein the display processor pipeline comprises a source surface processor pipe (SSPP), a display surface processor pipe (DSPP), and a mixer, and
wherein the processor and the memory, being configured to bypass the loading of the frame rotation animation into the first portion of the display processor pipeline, are further configured to close the DSPP in response to determining that the video playback is HDR format.

8. The apparatus of claim 7, wherein the processor and the memory, being configured to load the frame rotation animation into the first portion, are further configured to load the frame rotation animation into a first buffer, and wherein the processor and the memory, being configured to load the frame rotation animation into the second portion, are further configured to load the frame rotation animation into a second buffer.

9. The apparatus of claim 8, wherein the second buffer is configured for storing HDR format data, and the first buffer is configured for storing non-HDR format data.

10. The apparatus of claim 7, wherein the processor and the memory are further configured to execute a concurrent write-back function to enable loading the frame rotation animation into the second portion if the video playback is in an HDR format.

11. The apparatus of claim 7, wherein the processor and the memory are further configured to:
receive an indication that the frame rotation animation process has ended; and
open the DSPP in response to the indication that the frame rotation animation process has ended.

12. An apparatus, comprising:
means for receiving an indication that a frame rotation animation process for video playback has been initiated, the means for receiving comprising a processor pipeline;
means for determining whether the video playback is an HDR format or another format;
in response to a determination of a format of the video playback, and receipt of the indication:
if the video playback is in an HDR format:
means for bypassing a loading of the frame rotation animation into a first portion of the display processor pipeline, and
means for loading the frame rotation animation into a second portion of the display processor pipeline; and
if the video playback is in the other format, means for loading the frame rotation animation into the first portion of the processor pipeline, wherein the second portion is further in processing steps of the display processor pipeline than the first portion,
wherein the processor pipeline comprises a source surface processor pipe (SSPP), a display surface processor pipe (DSPP), and a mixer, and
wherein the means for bypassing the loading of the frame rotation animation into the first portion of the processor pipeline further comprises means for closing the DSPP in response to determining that the video playback is HDR format.

13. The apparatus of claim 12, wherein the means for loading the frame rotation animation into the first portion comprises means for loading the frame rotation animation into a first buffer, and the means for loading the frame rotation animation into the second portion comprises means for loading the frame rotation animation into a second buffer.

14. The apparatus of claim 13, wherein the second buffer is configured for storing HDR format data, and the first buffer is configured for storing non-HDR format data.

15. The apparatus of claim 12, further comprising means for executing a concurrent write-back function to enable loading the frame rotation animation into the second portion if the video playback is in an HDR format.

16. The apparatus of claim 12, further comprising:
means for receiving an indication that the frame rotation animation process has ended; and
means for opening the DSPP in response to the indication that the frame rotation animation process has ended.

17. The apparatus of claim 12, wherein:
the means for receiving comprises a display processor; and
the means for determining comprises the display processor.

18. A non-transitory computer-readable storage medium that stores instructions that when executed by a processor of an apparatus cause the apparatus to perform a method for high dynamic range (HDR) video rotation, the method comprising:
- receiving, by a display processor, an indication that a frame rotation animation process for video playback has been initiated, the display processor comprising a display processor pipeline;
- determining whether the video playback is an HDR format or another format;
- in response to the determination and receiving the indication:
  - if the video playback is in an HDR format:
    - bypassing a loading of the frame rotation animation into a first portion of the display processor pipeline, and
    - loading the frame rotation animation into a second portion of the display processor pipeline; and
  - if the video playback is in the other format, loading the frame rotation animation into the first portion of the display processor pipeline, wherein the second portion is further in processing steps of the display processor pipeline than the first portion,
- wherein the display processor pipeline comprises a source surface processor pipe (SSPP), a display surface processor pipe (DSPP), and a mixer, and
- wherein bypassing the loading of the frame rotation animation into the first portion of the display processor pipeline further comprises closing, by the display processor, the DSPP in response to determining that the video playback is HDR format.

19. The non-transitory computer-readable storage medium of claim 18, wherein loading the frame rotation animation into the first portion comprises loading the frame rotation animation into a first buffer, and loading the frame rotation animation into the second portion comprises loading the frame rotation animation into a second buffer.

20. The non-transitory computer-readable storage medium of claim 19, wherein the second buffer is configured for storing HDR format data, and the first buffer is configured for storing non-HDR format data.

21. The non-transitory computer-readable storage medium of claim 18, further comprising executing a concurrent write-back function to enable loading the frame rotation animation into the second portion if the video playback is in an HDR format.

22. The non-transitory computer-readable storage medium of claim 18, wherein the method further comprises:
- receiving, by the display processor, an indication that the frame rotation animation process has ended; and
- opening, by the display processor, the DSPP in response to the indication that the frame rotation animation process has ended.

* * * * *